United States Patent [19]
Leis et al.

[11] 4,380,723
[45] Apr. 19, 1983

[54] DIGITAL VELOCITY SERVO

[75] Inventors: Michael D. Leis, Framingham; Robert C. Rose, Hudson, both of Mass.

[73] Assignee: Digital Equipment Corporation, Maynard, Mass.

[21] Appl. No.: 46,130

[22] Filed: Jun. 5, 1979

[51] Int. Cl.³ .............................................. H02P 5/16
[52] U.S. Cl. .................................... 318/314; 318/318; 318/327
[58] Field of Search ............... 318/314, 318, 326, 327, 318/341; 331/1 A, 27; 324/83 FE, 83 FD; 328/155

[56] References Cited

U.S. PATENT DOCUMENTS

| | | | |
|---|---|---|---|
| 3,176,208 | 3/1965 | Gifft | 318/314 |
| 3,351,868 | 11/1967 | Farrow | 331/27 |
| 3,500,160 | 3/1970 | Sommer | 318/314 |
| 3,546,553 | 12/1970 | Loyd | 318/318 |
| 3,628,114 | 12/1971 | Pattantyus | 318/314 |
| 3,851,742 | 12/1974 | Sommer | 192/103 F |
| 3,858,100 | 12/1974 | Bussi | 318/314 |
| 3,936,663 | 2/1976 | Taylor et al. | 235/150.51 |
| 4,117,419 | 9/1978 | Rudd | 324/83 FE |
| 4,155,033 | 5/1979 | DeBell et al. | 318/314 |

*Primary Examiner*—David Smith, Jr.
*Attorney, Agent, or Firm*—Cesari and McKenna

[57] ABSTRACT

A servo circuit for electronically controlling the operation of an electric motor is disclosed. The rotational frequency of the motor is converted into a varying frequency waveform by a tachometer. The tachometer output is applied to a conversion circuit which includes a peak detector that converts the output waveform of the tachometer into a square-wave signal. The square-wave signal is, in turn, connected to one input of an exclusive-OR gate. The peak detector square-wave signal is also applied to a shift register which, after a time delay, applies the same signal to another input of the exclusive-OR gate. With these connections, the exclusive-OR gate produces a square-wave output whose duty cycle is proportional to the speed of the DC motor. This output can then be either amplified and applied directly to the electric motor to drive it, or integrated and applied to an amplifier to drive the motor in accordance with standard servo techniques.

6 Claims, 2 Drawing Figures

DIGITAL VELOCITY SERVO

BACKGROUND OF THE INVENTION

1. Field of the Invention

This invention relates to electronic servo circuits for controlling electric motors.

2. Description of the Prior Art

Present-day electric apparatus often utilizes direct current motors to rotate or move mechanical parts. The rotational speed and power output of such motors are generally controlled by means of servo circuitry which controls the electric power applied to the motor. The servo circuitry receives as inputs various measured parameters, such as position of the motor shaft or the torque produced by the motor, processes these inputs, and produces an output signal to control the motor.

Often, it is desirable to maintain a constant motor speed by means of a servo circuit. In such a case, the motor shaft is generally connected to a tachometer which produces a varying output, often a train of pulses, with a frequency related to the rotational speed of the motor. A frequency-to-voltage converter is then used to convert the output developed by the tachometer into a DC voltage which then can be processed by standard amplifier circuitry into the power output necessary to control the motor.

Many prior art circuits have been designed to perform the necessary frequency-to-voltage conversion. In one such system, each output pulse produced by the tachometer is applied to a monostable multivibrator which, after a predetermined time interval, sets a latch. The latch is reset by the next tachometer pulse. The latch circuit produces a square wave output whose duty cycle is proportional to the error between the actual motor speed and the desired motor speed. The output of the latch is connected in a feedback circuit so that the output duty cycle and, thus, the error is minimized during circuit operation.

Another prior art circuit utilizes phase comparison to control motor speed. In this type of circuitry the output pulses produced by the tachometer are applied to one input of a phase comparator. A reference oscillator is connected to the other input of the phase comparator. The phase comparator produces an output which is proportional to the difference in phase between the tachometer output and the reference signal; this output is amplified and used to drive the motor.

Although the above prior art circuits perform the required control function, each has its own problems. The multivibrator circuit described above operates to adjust motor speed to a constant determined by the time constant of the multivibrator. This time constant is in turn determined by values of electronic components which are subject to change by thermal effects and aging. Thus to insure constant speed the components used in the multivibrator must be (1) precision components, (2) temperature compensated, or (3) adjusted at the time of manufacture; each alternative is expensive. A second problem with the multivibrator circuit is that it needs additional circuitry to start the motor from a power-off condition, since the servo loop may not be self-starting or may be slow in starting.

The phase comparison circuitry requires a phase comparator circuit which is generally complicated and expensive.

SUMMARY OF THE INVENTION

The foregoing problems and others have been solved in one illustrative embodiment of a motor servo control circuit in which frequently-to-voltage conversion is performed by using a shift register delay circuit. Basically, a tachometer waveform having a period proportional to the rotational period of the motor is first limited to produce a square-wave output by a peak detector. This output waveform is then delayed by means of a standard shift register shifted by a precise frequency reference. The output of the shift register and the output of the peak detector are applied to an exclusive-OR gate which produces a pulsed output where the pulses have a duration equal to the delay introduced by the shift register and a pulse spacing equal to the difference between one-half the period of the peak detector square wave output and the delay time. In effect, the pulses produced by the exclusive-OR gate have a duty cycle that varies proportionally to the frequency of the signal produced by the tachometer. If, for example, the delay introduced by the shift register is chosen to be one-quarter of the period of the tachometer signal at the desired motor rotational speed, the duty cycle of the output produced by the exclusive-OR gate will be fifty percent when the motor is running at the desired speed. The duty cycle will be less than fifty percent if the motor is running at a speed below the desired speed and will be greater than fifty percent if the motor is running at a speed higher than the desired speed. The output of the exclusive-OR gate may be amplified and applied directly to the motor or simply integrated by using a low-pass filter and applied to an amplifier to drive the motor.

The delay introduced by the shift register and the corresponding motor speed is controlled by a reference frequency that can be easily derived from the system clock which is generally a crystal-controlled clock. The frequency-to-voltage conversion circuitry itself needs no temperature compensation or adjustment and is, therefore, simple and uncomplicated.

DETAILED DESCRIPTION

Figure 1:
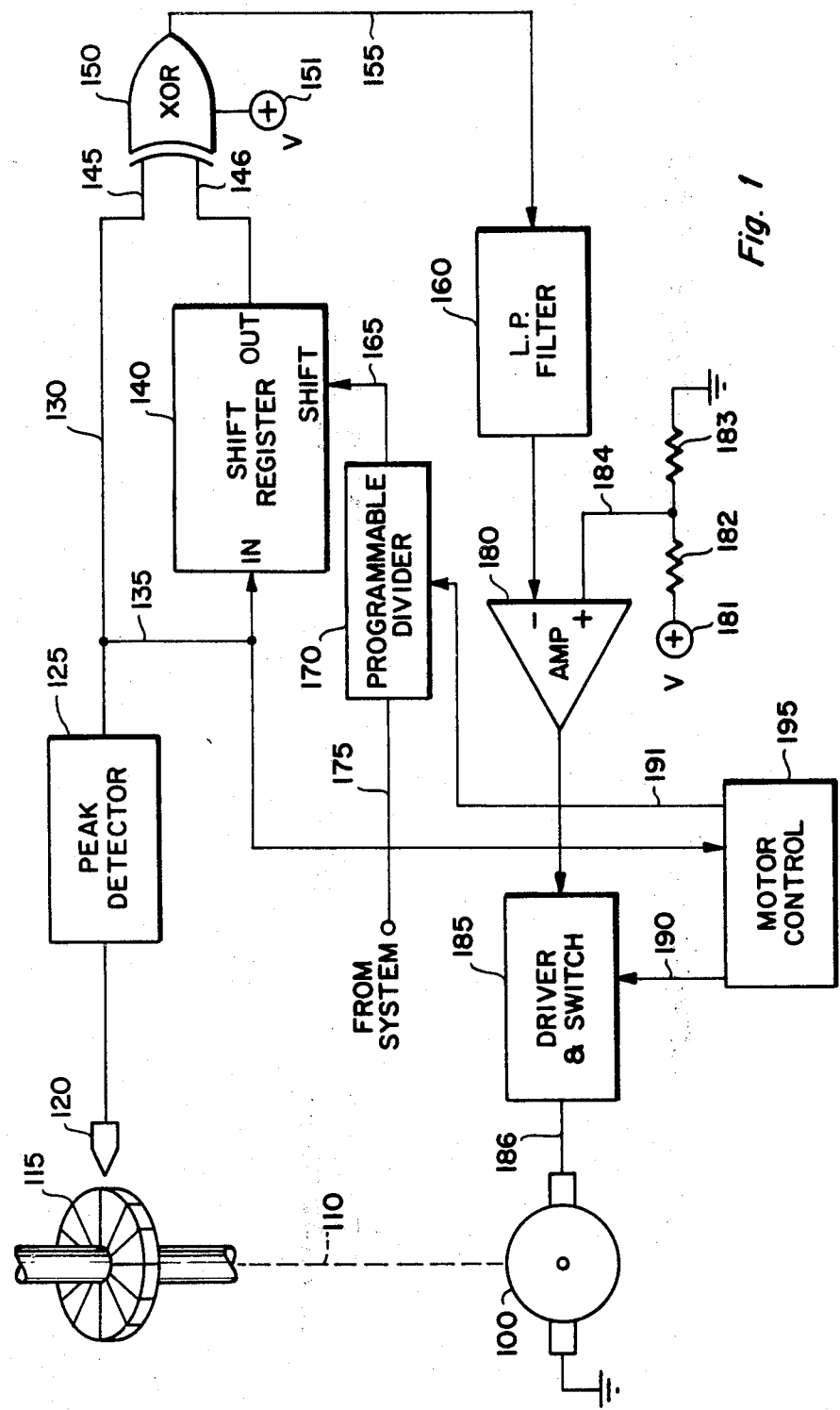
FIG. 1 shows a block diagram of the illustrative servo circuit.

Referring to FIG. 1, a direct current motor 100 is controlled by servo circuitry consisting of peak detector 125, shift register 140, gate 150, filter 160, amplifier 180 and driver 185 operating under control of motor control circuitry 195 to run at various constant speeds. Motor 100 may illustratively be any conventional type of direct current motor, for example, a permanent magnet or field coil excited motor. As will be hereinafter described, the servo circuitry receives commands from motor control 195 causing the circuitry to control the electric power applied to motor 100.

The servo circuitry monitors the rotational speed of motor 100 by means of a tachometer connected to the motor shaft. Specifically, the tachometer comprises slotted wheel 115 and variable reluctance coil pickup 120. The tachometer arrangement is coupled directly to motor 100 by means of shaft 110.

Figure 2:
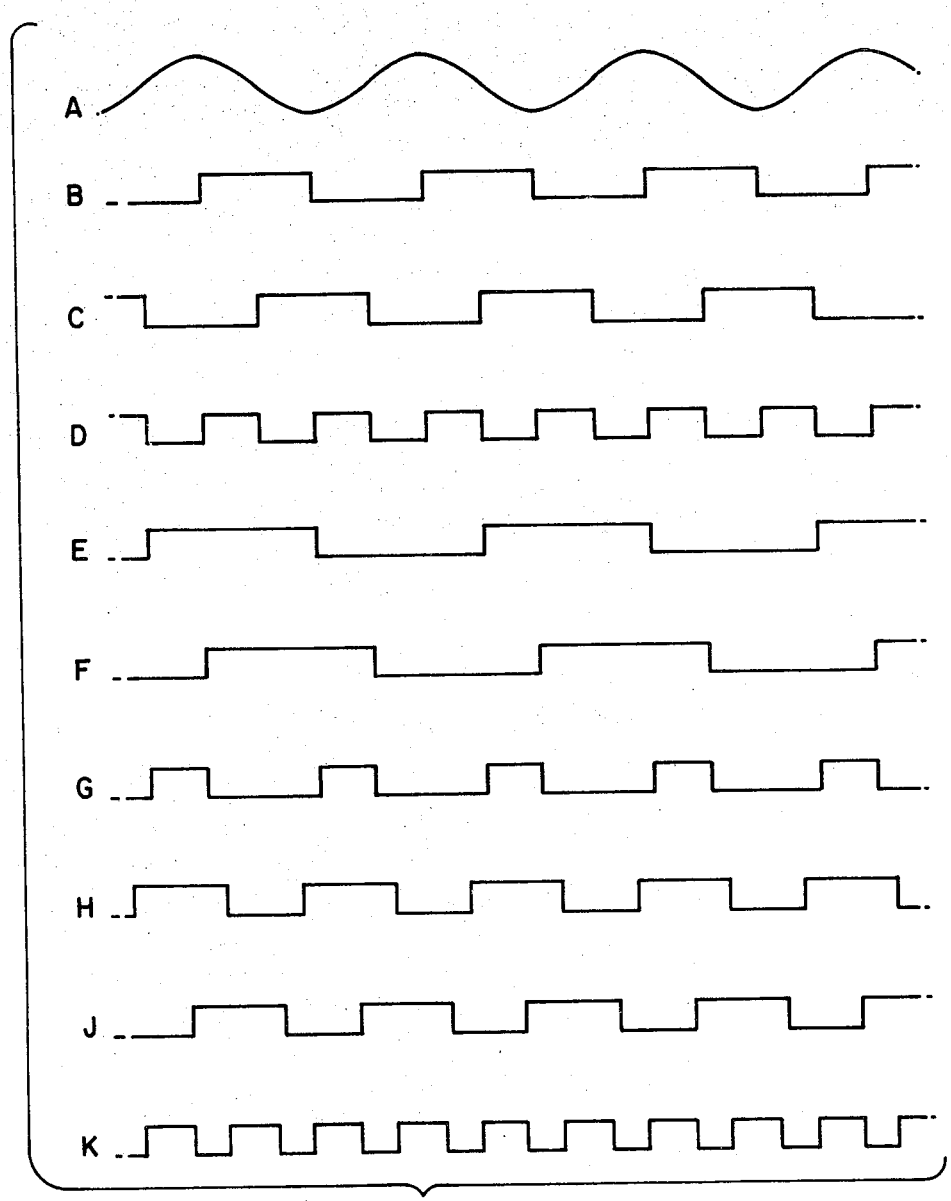
FIG. 2 shows a plurality of voltage waveforms at selected points in FIG. 1.

The tachometer arrangement used to sense the rotational speed of motor 100 may be any conventional arrangement, including a photocell and light and slotted wheel arrangement or the slotted disk and magnetic pickup arrangement shown in FIG. 1. Well-known detectors of this type typically produce a sinusoidal-like output as shown in FIG. 2A. Each peak in the waveform corresponds to the passage of a slot in wheel 15 past pickup 12∅ or, in the case of an optical arrangement, the passage of a slot by the photocell and light arrangement.

The varying voltage produced by the tachometer device is applied to peak detector 125 which serves to convert the analog waveform into a squared waveform suitable for use with digital electronics. Peak detector 125 may be of any conventional design which produces a square wave output having a signal transition corresponding to each positive or negative peak in the input waveform. For example, typical prior art circuitry which may be used to perform this function consists of a differentiator and a zero crossing detector. Another device which performs a similar function is a subtraction peak detector in which the input waveform is subtracted from a slightly delayed copy. The difference becomes zero at the peaks of the input waveform. Due to the delay introduced in the processing of the signal waveform with this type of subtraction circuitry, output signal transitions corresponding to input signal peaks are delayed by a small amount of time.

Assuming that peak detector 125 is a subtraction peak detector, the output waveform produced by the tachometer output is shown in FIG. 2B, which output consists of a square waveform with period T having a signal transition corresponding to the positive and negative peaks in the tachometer output.

The peak detector output is then applied to the frequency-to-voltage converter circuitry consisting of shift register 14∅ and exclusive-OR gate 15∅ which produces a square-wave output having a duty cycle proportional to the frequency of the input waveform, which output is then used to control the electric power applied to motor 1∅∅.

Specifically, the output of peak detector 125 is applied via leads 13∅ and 135 to upper input 145 of exclusive-OR gate 15∅ and shift register 14∅, respectively. The output of peak detector 125 is also applied to motor control 195 for the purpose of slowing down the motor as will be later described.

Shift register 14∅ is of conventional design and consists of a plurality of stages connected in series. Data applied to the input is shifted from stage to stage under control of a clocking signal applied to shift input 165. On the rising edge of a clock pulse applied to shift input 165, data present at the shift register input is sampled and on the falling input of a clock pulse applied to shift register 14∅, the sample data is shifted into the first stage. Each stage then shifts the data stored therein to the next sequential stage and the last stage data appears on the output lead 146. Thus, shift register 14∅ produces a signal equivalent to that present at its input after a delay in time. The amount of delay is determined by the number of stages in shift register 14∅ multiplied by the time interval between clock pulses applied to shift input 165. To insure proper operation of the circuitry, shift register 14∅ must have a plurality of stages. The reason for this is that the signal transitions in the output of peak detector 125 occur asynchronously with respect to the clock pulses applied to shift input 165. Therefore a sampling delay of up to one clock pulse might occur before the input to register 14∅ is sampled by the internal circuitry. This unpredictable sampling delay causes a variation in the actual delay introduced by register 14∅ into the servo circuitry. As the number of shift register stages is increased the sampling delay becomes a smaller percentage of the actual delay and thus the error introduced by it decreases. Illustratively, shift register 14∅ may consist of 18 stages.

Shift input 165 receives clocking pulses from programmable divider 17∅ which, in turn, receives a constant frequency clock pulse on its input lead 175 from the system clock (not shown). Advantageously, the system clock may be crystal-controlled and is therefore extremely stable over time despite temperature variations and aging of the other components in the circuitry. Divider 17∅ is also controlled by signals on lead 191 from motor control 195. By appropriate signals, control 195 (which might illustratively include a microprocessor) may control the division constant in divider 17∅ thus effectively controlling the clock frequency applied to register 14∅. A change in the frequency of clock pulses applied to register 14∅ directly changes the delay and will, in turn, change the speed of the motor, as will hereinafter be described.

Assume, for the purposes of illustration, that the number of shift register stages and the clock pulse frequency is such that the delay introduced by shift register 14∅ is equal to one quarter of the period (T) of the tachometer waveform at rated velocity. The output of shift register 14∅ is then as shown in FIG. 2C.

The output of register 14∅ is applied to the lower input of exclusive-OR gate 15∅. Exclusive-OR gate 15∅ is a well-known logic device which produces a high signal at its output 155 when either one, but not both, of its inputs 145 and 146 are high. With the input waveform 2B applied to input 145 and waveform 2C applied to input 146, the output produced on output lead 155 is shown in FIG. 2D. It consists of a square wave output with a 5∅ percent duty cycle having an amplitude equivalent to the supply voltage 151 (magnitude V) applied to gate 15∅.

As will be described in detail below, the signal produced on the output 155 of gate 15∅ has a duty cycle proportional to the frequency of the signal from peak detector 125. This signal is then filtered and amplified to produce the control signal for motor 1∅∅. Specifically, output 155 of gate 15∅ is applied to low pass filter 16∅ which may illustratively be a single pole filter consisting of a resistor and capacitor. Filter 16∅ integrates the output signal (waveform 2D), producing a D.C. value having a magnitude of approximately V/2.

This D.C. signal is applied to the upper input of feedback amplifier 18∅. The lower input of amplifier 18∅ receives a reference voltage on lead 184 from the junction of resistors 182 and 183. Resistors 182 and 183 from a voltage divider between voltage source 181 and ground. Advantageously, voltage source 181 is the same source as source 151 used to provide power to exclusive-OR gate 15∅. Variations in the magnitude V of the source will then be automatically cancelled by the circuitry.

The values of resistors 182 and 183 may be chosen to give any fraction of the source voltage V. The selection of resistors 182 and 183 determines the operating point of the system for a predetermined delay introduced by register 14∅. For example, if register 14∅ introduces a delay of T/4, the servo system will be balanced if the value of resistor 182 equals the value of resistor 183. The output of amplifier 18∅ is applied to driver circuit 185 which in turn produces a drive signal on its output 186 to operate motor 100. Motor 100 is thereby provided with the appropriate electric power to cause it to run at a predetermined constant speed.

Assume now that some condition, such as increasing the load on motor 100, causes its speed to decrease. When this happens, the period of the pulses produced by peak detector 125 in response to the tachometer output increases as shown in FIG. 2E (i.e., the frequency decreases).

Similarly, the period of the signal output of shift register 140 increases as shown in FIG. 2F. The delay introduced by shift register 140, however, remains the same (T/4) since the delay is determined by the clock pulses applied to shift lead 165 and these clock pulses do not change frequency for a given operations condition. As shown in FIG. 2G, the duration of the pulses produced at the output 155 of gate 150 remains constant, but their frequency decreases. This causes the effective duty cycle of the signal from the exclusive-OR gate 150 to decrease. Accordingly, the magnitude of the D.C. signal produced by filter 160 is lower.

Amplifier 180 responds to this lower signal at its negative input by increasing its output, in turn causing driver 185 to increase its output to motor 100. Motor 100 is thereby caused to increase its speed.

Assume now instead that external conditions cause the speed of motor 100 to increase. The period of the output signal of peak detector 125 decreases (i.e., its frequency increases) as shown in FIG. 2H. The period of the waveform produced at the output of shift register 140 also decreases as shown in FIG. 2J. However, as in the previous case, the delay remains the same, so the duration, or width, of the pulses produced by gate 150 therefore remains the same but the frequency increases, causing the effective duty cycle of the signal at the output 155 to increase. Responsive to an increased duty cycle at its input, filter 160 produces an output with a larger magnitude. Upon receiving the output with increased amplitude amplifier, 180 decreases its output causing driver 185 to decrease its drive to motor 100, thereby causing the motor speed to decrease.

Thus, advantageously motor control 195 may control the operation of the servo circuitry to dynamically switch motor 100 from one speed to another by changing the division constant of programmable divider 170. As explained above, a change in the division constant will effectively change the amount of delay introduced into the circuitry by register 140 and this the pulse width. The amount of delay is directly proportional to the duration of the output pulses produced by OR gate 150 and thus directly affects the duty cycle which in turn changes the drive applied to motor 100. A change from one speed to another may be effected in several ways. For example, in some servo systems power may be reversed thus slowing the motor. In order to keep the system stable, the servo loop in this type of system must be able to sense the direction of rotation of the motor. In other systems, however, such as the circuit described herein, the servo circuit cannot sense the direction of rotation of the motor; only the speed error can be sensed by the tachometer. In this type of system, to effect a change from a higher speed to a lower speed the drive provided to motor 100 may simply be reduced and the motor allowed to coast to a lower speed. Advantageously, the servo circuitry may be used to produce positive braking to slow the motor down.

Positive braking may be accomplished by motor control 195 applying a reversing signal to drive circuit 185 by means of lead 190. The reversing signal introduces an inversion into the driver amplifiers causing them to apply a reverse current to motor 100. The servo circuitry, sensing a speed slow-down in motor 100, causes amplifier 180 to apply a larger signal to driver 185 in accordance with the principles described above. In response to the larger signal, however, driver 185 only applies a larger reverse current to motor 100, slowing it even faster.

In the braking configuration the circuitry is in a so-called "positive feedback" configuration. If the circuitry remained in this configuration, the motor speed would eventually reverse and increase in the reverse direction indefinitely. To prevent such an occurrence motor control 195 monitors the period of the pulses produced by peak detector 125. When this period exceeds a reference time interval, control 195 controls driver 185 to remove all power from motor 100 allowing it to coast to the lower speed.

Obvious variations to the principles of operation of the invention described above would occur to those skilled in the art. For example, with some types of motors, the output of gate 150 may be amplified and used to directly drive motor 100, thereby eliminating filter 160, amplifier 180, and driver 185. This and other similar variations are within the scope of the invention.

What is claimed is:

1. An electric motor servo control system for controlling the speed of an electric motor comprising:
    A. speed signal means for producing a speed signal consisting essentially of pulses whose time period of repitition is proportional to the rotational period of the motor,
    B. delay means for receiving the speed signal from said speed signal means and producing a delayed speed signal consisting essentially of pulses delayed from the pulses of the speed signal by a predetermined time interval that is less than the duration of the pulses of the speed signal whenever the speed of the motor is within an intended speed range,
    C. logical-combination means for receiving said speed signal and said delayed speed signal and for generating a sequence of constant-width, variable-frequency motor-control pulses wherein the pulse width is substantially equal to said predetermined time interval and the pulse frequency is proportional to the repetition frequency of the speed signal, the duty cycle of the motor-control pulses thereby varying in response to variations of the rotational speed of the motor, and
    D. means for receiving the motor-control pulses from said logical-combination means and adapted for coupling to the motor to drive the motor in accordance with the duty cycle of said motor-control pulses.

2. An electric motor servo control system as recited in claim 1 wherein said delay means includes a shift register means having an input terminal for receiving said speed signal and an output terminal at which it produces said delayed speed signal, said delay means further including means for shifting the contents of said shift register from its input terminal to its output terminal at a predetermined rate.

3. An electric motor servo control system as recited in claim 2 wherein said logical-combination means comprises an exclusive-OR gate having input terminals for receiving said speed signal and said delayed speed signal and an output terminal at which it produces said motor-control pulses.

4. A servo system for controlling an electric motor comprising:
   A. A tachometer connected to said motor for producing a tachometer signal having a period proportional to the rotational period of said motor,
   B. a peak detector responsive to said tachometer signal for producing a square wave output having signal transitions corresponding to the peaks in said tachometer signal,
   C. a shift register responsive to said square wave output for producing an output equivalent to said square wave output delayed by a predetermined interval of time,
   D. an exclusive-OR gate responsive to said square wave output and said shift register output for generating a motor-control signal consisting essentially of constant-width, variable-frequency motor-control pulses wherein the pulse width is substantially equal to said predetermined interval of time and the pulse frequency is proportional to the repetition frequency of the tachometer signal, and
   E. means responsive to said motor-control pulses for controlling the rotational speed of said motor in accordance with the duty cycle of the motor-control signal.

5. An electric motor servo control system as recited in claim 4 additionally comprising means for braking the motor in response to a braking command, said braking means including:
   i. means responsive to said braking command for reversing the current supplied to said motor,
   ii. means connected to said motor for monitoring the rotational period of said motor, and
   iii. means for interrupting said current supplied to said motor when said rotational period of said motor exceeds a second predetermined time interval.

6. An electric motor servo control system as recited in claim 1 wherein said logical-combination means comprises an exclusive-OR gate having input terminals receiving said speed signal and said delayed speed signal and an output terminal at which it prouces said motor-control pulses.

* * * * *